(12) United States Patent
Canales et al.

(10) Patent No.: US 12,255,461 B2
(45) Date of Patent: Mar. 18, 2025

(54) CHARGING STATION WITH HIGH FREQUENCY DISTRIBUTION NETWORK

(71) Applicant: ABB E-mobility B.V., Delft (NL)

(72) Inventors: Francisco Canales, Baden-Däwil (CH); Ki-Bum Park, Fislisbach (CH)

(73) Assignee: ABB Schweiz AG, Baden (CH)

( * ) Notice: Subject to any disclaimer, the term of this patent is extended or adjusted under 35 U.S.C. 154(b) by 784 days.

(21) Appl. No.: 17/366,488

(22) Filed: Jul. 2, 2021

(65) Prior Publication Data

US 2021/0336440 A1    Oct. 28, 2021

Related U.S. Application Data

(63) Continuation of application No. PCT/EP2019/084452, filed on Dec. 10, 2019.

(30) Foreign Application Priority Data

Jan. 2, 2019    (EP) ..................... 19150044

(51) Int. Cl.
*H02J 3/34* (2006.01)
*B60L 53/122* (2019.01)

(52) U.S. Cl.
CPC .............. *H02J 3/34* (2013.01); *B60L 53/122* (2019.02); *B60L 2210/10* (2013.01); *B60L 2210/30* (2013.01); *B60L 2210/42* (2013.01); *H02J 2310/48* (2020.01)

(58) Field of Classification Search
USPC ................. 320/106, 107, 108, 109, 112, 110
See application file for complete search history.

(56) References Cited

U.S. PATENT DOCUMENTS

| | | | |
|---|---|---|---|
| 9,030,843 B1 | 5/2015 | Herbert | |
| 9,859,755 B2* | 1/2018 | Beaver | B60L 53/37 |
| 10,493,853 B2* | 12/2019 | Widmer | H04B 5/79 |
| 2015/0270719 A1* | 9/2015 | Kurs | H02J 50/80 |
| | | | 320/108 |
| 2016/0031330 A1 | 2/2016 | Ishigaki | |
| 2017/0158064 A1 | 6/2017 | Yasuda et al. | |
| 2018/0194236 A1* | 7/2018 | Elshaer | B60L 53/12 |

(Continued)

FOREIGN PATENT DOCUMENTS

| | | |
|---|---|---|
| CN | 203368042 U | 12/2013 |
| CN | 103595109 A | 2/2014 |

(Continued)

OTHER PUBLICATIONS

China National Intellectual Property Administration, Office Action in Chinese Patent Application No. 201980087719.4, 17 pp. (Jul. 12, 2023).

(Continued)

*Primary Examiner* — Brian Ngo
(74) *Attorney, Agent, or Firm* — Leydig, Voit & Mayer, Ltd.

(57) ABSTRACT

A charging station for electric vehicles includes a central part for converting a grid AC voltage from an electrical grid into a high frequency AC voltage; a distribution network for distributing the high frequency AC voltage; and a plurality of coils directly connected to the distribution network, wherein each coil is adapted for transferring energy to an electrical vehicle.

14 Claims, 9 Drawing Sheets

(56) References Cited

U.S. PATENT DOCUMENTS

2019/0257902 A1\* 8/2019 Kanakasabai ..... H02M 3/33576
2020/0200937 A1\* 6/2020 Widmer ................ B60L 53/122

FOREIGN PATENT DOCUMENTS

| CN | 106541845 A | 3/2017 |
|---|---|---|
| CN | 207579603 U | 7/2018 |
| EP | 2514627 A1 | 10/2012 |

OTHER PUBLICATIONS

Ahmadi et al., "A review on topologies for fast charging stations for electric vehicles," *2016 IEEE International Conference on Power System Technology (POWERCON)*, 6 pp. (Sep.-Oct. 2016).

Channegowda et al., "Comprehensive review and comparison of DC fast charging converter topologies: improving electric vehicle plug-to-wheels efficiency," *2015 IEEE 24th International Symposium on Industrial Electronics (ISIE)*, 263-268 (Jun. 2015).

Dujic et al., "Power electronic traction transformer-low voltage prototype," *IEEE Transactions on Power Electronics*, 28(12): 5522-5534 (Dec. 2013).

Energy Star, "Market and Industry Scoping Report," 16 pp. (Sep. 2013).

Jain et al., "A review of high-frequency power distribution system: for space, telecommunication, and computer applications," *IEEE Transactions on Power Electronics*, 29(8): 3852-3863 (Aug. 2014).

Kouro et al., "Recent advances and industrial applications of multilevel converters," *IEEE Transactions on Industrial Electronics*, 57(8): 2553-2580 (Aug. 2010).

Winkelnkemper et al., "A modular direct converter for transformer-less rail interties," *2010 IEEE International Symposium on Industrial Electronics*, 562-567 (Jul. 2010).

Yang et al., "LLC resonant converter for front end DC/DC conversion," *APEC. Seventh Annual IEEE Applied Power Electronics Conference and Exposition*, 1108-1112 (Mar. 2002).

European Patent Office, International Search Report in International Patent Application No. PCT/EP2019/084452, 3 pp. (Jan. 20, 2019).

European Patent Office, Written Opinion in International Patent Application No. PCT/EP2019/084452, 5 pp. (Jan. 20, 2019).

European Patent Office, International Preliminary Report on Patentability in International Patent Application No. PCT/EP2019/084452, 14 pp. (Oct. 9, 2020).

China National Intellectual Property Administration, Office Action in Chinese Patent Application No. 201980087719.4, 13 pp. (May 25, 2024).

\* cited by examiner

CHARGING STATION WITH HIGH FREQUENCY DISTRIBUTION NETWORK

CROSS-REFERENCE TO RELATED APPLICATIONS

This patent application is a U.S. continuation application of International Patent Application No. PCT/EP2019/084452, filed on Dec. 10, 2019, and claims the benefit of European Patent Application No. 19150044.6, filed Jan. 2, 2019, the disclosures of which are incorporated herein by reference in their entireties for all purposes.

FIELD OF THE INVENTION

The invention relates to a charging station for electric vehicles.

BACKGROUND OF THE INVENTION

With increasing number of electric vehicles, the importance of charging stations for these vehicles is growing. It is foreseen that in the future the charging requirement of a car will be higher than 350 kW. Since the total power consumption of a charging station may reach multi-megawatt, the power density of a distribution network of the charging station becomes more and more important.

At these power levels, it is common to utilize a low frequency transformer to step down the voltage from a medium voltage AC grid. Furthermore, a low frequency transformer may be used to provide an isolation in the charging pole between a car and the grid for safety purpose. However, bulky transformers for conventional 50 Hz based distribution network usually require a large foot print of the charging station.

DESCRIPTION OF THE INVENTION

It is an objective of the invention to reduce the foot print and the costs of a charging station. It is a further objective of the invention to increase the power density of a charging station.

These objectives are achieved by the subject-matter of the independent claims. Further exemplary embodiments are evident from the dependent claims and the following description.

The invention relates to a charging station for electric vehicles. An electrical vehicle may be a means of transportation on land, in water or air, which comprises a drive being supplied with electrical energy. This energy may be stored on batteries that are charged by the charging station.

For example, an electrical vehicle may be a car, bus, motorcycle, ship, airplane, etc.

According to an embodiment of the invention, the charging station comprises a central part for converting a grid AC voltage from an electrical grid into a high frequency AC voltage, an (AC) distribution network for distributing the high frequency AC voltage, and a plurality of coils directly connected to the distribution network, wherein each coil is adapted for transferring energy to an electrical vehicle.

For grid friendly operation, the charging station may incorporate further interconnection with additional storage and/or renewable energy sources. The charging station may also provide grid support to the electrical grid to meet grid codes.

The central part may comprise a housing, in which components, such as converters and a transformer are housed. It may be that the central part comprises components that are remote from each other, i.e. that the central part is a distributed system.

The central part may be connected to an electrical grid. The frequency of the grid AC voltage may be less than 100 Hz, such as 50 Hz or 60 Hz. The grid AC voltage may be a medium voltage of more than 3 kV, for example in the range from 3.3 kV to 20 kV.

The high frequency AC voltage may have a frequency of more than 10 times the frequency of the grid AC voltage. For example, the frequency of the high frequency AC voltage is more than 400 Hz, for example more than 10 kHz. The high frequency AC voltage may be a low voltage, such as a voltage of less than 3 kV, for example in a range between 230 V to 690 V.

Every coil, which is connected to the distribution network, may be a primary coil of a transformer, for example of a charging pole and/or a coil for wireless power transfer via an air gap.

The distribution network may be a two-phase network, which interconnects the coils with the central part. It may be that the coils are arranged remote from the central part, such as more than 10 m remote from the central part. The distribution network may connect the coils in parallel, for example it may have the form of a distribution bus. The distribution network may have lines, which interconnect a housing of the central part and housings, in which the coils are arranged, such as a housing of a charging pole or a housing of a ground coil for wireless power transfer.

It is also may be possible that the distribution network is solely provided inside an housing of the charging station and/or its central part. In this case it may be that converters for converting the high frequency AC voltage into a DC voltage are provided in this housing, which then may be distributed to charging poles. As a result, the charging pole may include just a control panel and/or a DC-to-DC converter, to control the charging rate of a battery, and/or components such as fuses, disconnectors and breakers.

By providing a central part and a high frequency distribution network, the power density of the charging station can be increased, since all inductive components connected to the high frequency distribution network can be decreased in size. Such inductors comprise transformers and coils.

With high frequency low voltage distribution, the power electronic converter of a charging pole may be become simpler, more efficient, and more reliable, because the number of power stage may be reduced.

It has to be noted that the central part may be modular and/or may comprise at least two converter units, which may be connected in series and/or in parallel with their inputs. The interconnection of the converter units may be chosen in dependence of the power to be processed and/or the level of their input voltage.

According to an embodiment of the invention, the central part comprises a transformer at its output side connected to the distribution network. The transformer may be a high frequency transformer, which may be less bulky than a low frequency transformer.

It is possible that the central part comprises an AC-to-AC matrix type converter. In this case, the electrical converter of the central part may be implemented with solely one transformer. It also may be possible that a medium voltage DC grid is available as a backbone to support an AC electrical grid. In this case, the charging station may be implemented just with one DC-to-AC converter.

According to an embodiment of the invention, the central part comprises at least two transformers having secondary coils connected in parallel to the distribution network. The primary sides of the transformers may be connected to different converter units of the central part.

According to an embodiment of the invention, the central part comprises a grid side AC-to-DC converter for receiving the grid voltage and at least one network side DC-to-AC converter, which are interconnected via a DC link. Both converters may be active converters, i.e. may have controllable switches. Both converters may be interconnected with a DC link, which may comprise a capacitor.

The network side converter may be a modular converter and/or may comprise at least two converter units, which may result in easy power scaling. The converter units may be connected in parallel with their input sides to the DC link. It also may be possible that the converter units are connected in series with their input sides and that each converter unit is connected in parallel to a section of a split DC link.

The one or more output transformers of the central part may be interconnected between the DC-to-AC converter and/or the converter units and the distribution network.

According to an embodiment of the invention, the central part comprises at least two DC-to-AC converters which are connected to the DC link via a DC distribution network.

The DC-to-AC converters may be remote from each other and/or from the AC-to-DC converter. The AC-to-DC converter and the DC-to-AC converters may be interconnected with a DC distribution network. The DC distribution network may have lines, which can have a length of more than 10 m. It may be that power is transferred via the DC distribution network to reduce a line length in the AC distribution network.

Every DC-to-AC converter may have one or more converter units and/or one or more output transformers as described above and below. Every DC-to-AC converter may be interconnected with a different high frequency AC distribution network, such as described above and below.

In the case of one AC-to-DC converter and one DC-to-AC converter of the central part, both converters may be accommodated in one housing and/or may be near to each other.

According to an embodiment of the invention, the DC-to-AC converter is composed of at least one converter unit, which is one of neutral point clamped type, T type, flying cap type and modular multi-level converter type.

According to an embodiment of the invention, the DC-to-AC converter is composed of at least two converter units, which are connected in series with their inputs. The converter units may be of the types as described above and below. Each of the series converter units may be connected to a section of a split DC link. The split DC link may comprise two or more series-connected capacitors. Every capacitor may provide a section of the split DC link.

According to an embodiment of the invention, the DC-to-AC converter is composed of at least two converter units, which are connected in parallel with their inputs. Again, the converter units may be of the types as described above and below. With a parallel connection, the power to be processed may be increased.

According to an embodiment of the invention, two converter units, such as two converter units of the DC-to-AC converter, are connected with their outputs via a primary coil of a transformer of the central part. Thus, the two converter units may have to be switched to generate opposite output voltages.

According to an embodiment of the invention, the charging system may comprise a resonant tank. Such a resonant tank may comprise a capacitor and an inductor. A resonant tank may increase high power conversion efficiency and/or may lower conduction losses in the distribution network. Furthermore, a resonant tank may result in a softer switching for a rectifier inside a charging pole connected to the distribution network. Furthermore, the usage of a resonant tank may result in good cross-regulation characteristics for multiple outputs (such as charging poles or wireless energy transfer coils). Also, open loop operation for the central charging station converter may be implemented.

According to an embodiment of the invention, the resonant tank is connected in the distribution network.

According to an embodiment of the invention, the resonant tank is connected between a transformer of the central part and the coils. The resonant tank may be connected between an output of the central part and the coils supplied by the distribution network. The resonant tank may be connected to a secondary side of the one or more output transformers of the central part.

According to an embodiment of the invention, the resonant tank is connected between a converter unit of the central part and a transformer of the central part. The resonant tank may be connected to a primary side of the one or more output transformers of the central part. It may be that every output transformer has a resonant tank of its own on its primary side.

As already mentioned, the distribution network may be used to supply high frequency coils, which are used for transferring power to the electric vehicles without galvanic coupling.

According to an embodiment of the invention, such a coil may be the primary coil of a transformer integrated into a charging pole. Such a transformer may be a high frequency transformer.

The charging pole furthermore may comprise one or more converters for converting the high frequency AC voltage into a charging DC voltage for charging an electric vehicle.

According to an embodiment of the invention, the charging pole comprises an AC-to-DC converter for receiving a voltage from the transformer, wherein the AC-to-DC converter of the charging pole supplies a DC-to-DC converter for generating a charging voltage.

The charging poles may be also interconnected to the distribution network in parallel to increase the charging capability or charging rate for the battery.

According to an embodiment of the invention, a coil connected to the distribution network is a coil for wireless energy transfer via an air gap. For example, such a coil may be a ground coil, over which an electric vehicle with a corresponding coil may be parked and charged. Also, moving electric vehicles may be charged with such coils, which may be placed inside a street.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
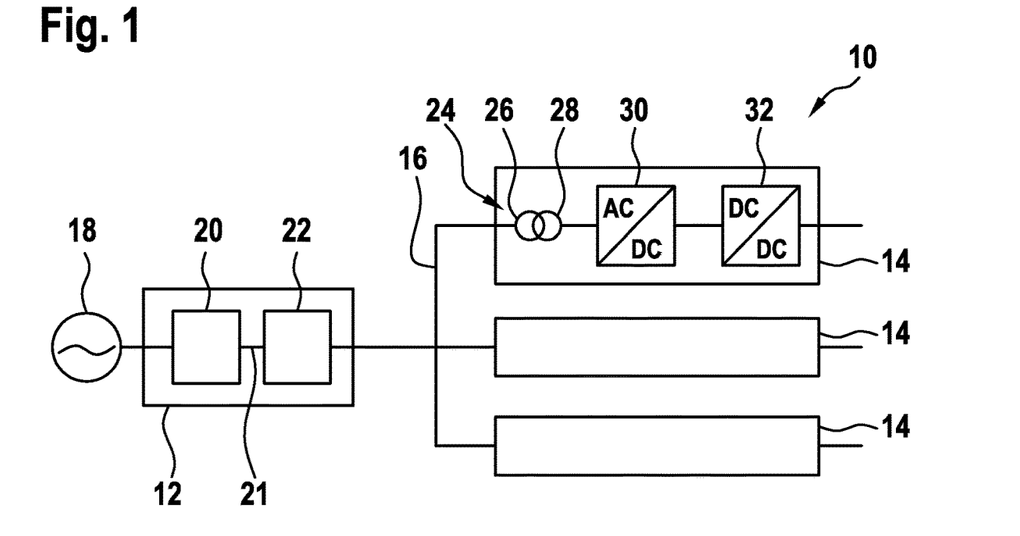
FIG. 1 schematically shows a charging station according to an embodiment of the invention.

FIG. 1 shows a charging station 10, which comprises a central part 12 and a plurality of charging poles 14, which are interconnected with the central part 12 via a high frequency AC distribution network 16.

The central part 12 is connected with an electrical grid 18, which may be three-phase, and the AC distribution network 16, which may be single-phase. The central part 12 converts a medium voltage from the grid 18 of for example 3.3 kV to 20 kV into a low voltage of for example 230 V to 690 V, which is supplied to the distribution network 16. The input voltage from the electrical grid 18 may have a frequency of 50 Hz or 60 Hz. The frequency of the voltage in the AC distribution network 16 may be a high frequency of more than 400 Hz, for example more than 10 kHz.

The central part 12 may be composed of an AC-to-DC converter 20 and a DC-to-AC converter 22, which are interconnected via a DC link 21. Alternatively, the central part 12 may comprise a direct AC-to-AC converter, which may have a single-stage structure, for example by utilizing a matrix-type converter topology.

For the AC-to-DC converter 20, a medium voltage active or passive rectifier, such as a multi-pulse rectifier with diodes or thyristors may be used. The AC-to-DC converter 20 also may be a multilevel converter and/or a modular multilevel converter.

The DC-to-AC converter 22 may be a multilevel converter and/or a modular multilevel converter. The DC-to-AC converter 22 may be composed of several converter units as will be described below in more detail.

A charging pole 14 comprise a transformer 24, which is directly connected with its primary coil 26 with the AC distribution network 16. An AC-to-DC converter 30, such as a passive diode rectifier, is connected to a secondary coil 28 of the transformer 24. It also may be that the AC-to-DC converter is an active rectifier. A charging pole 14 also may comprise a DC-to-DC converter 32, for example a buck/boost-converter, which is supplied by the AC-to-DC converter 30. To the DC-to-DC converter 32 or to the AC-to-DC converter 30, an electric vehicle may be connected for charging.

In FIG. 1, the components 20, 22 of the central part 12 may be provided in one housing and/or building.

Figure 2:
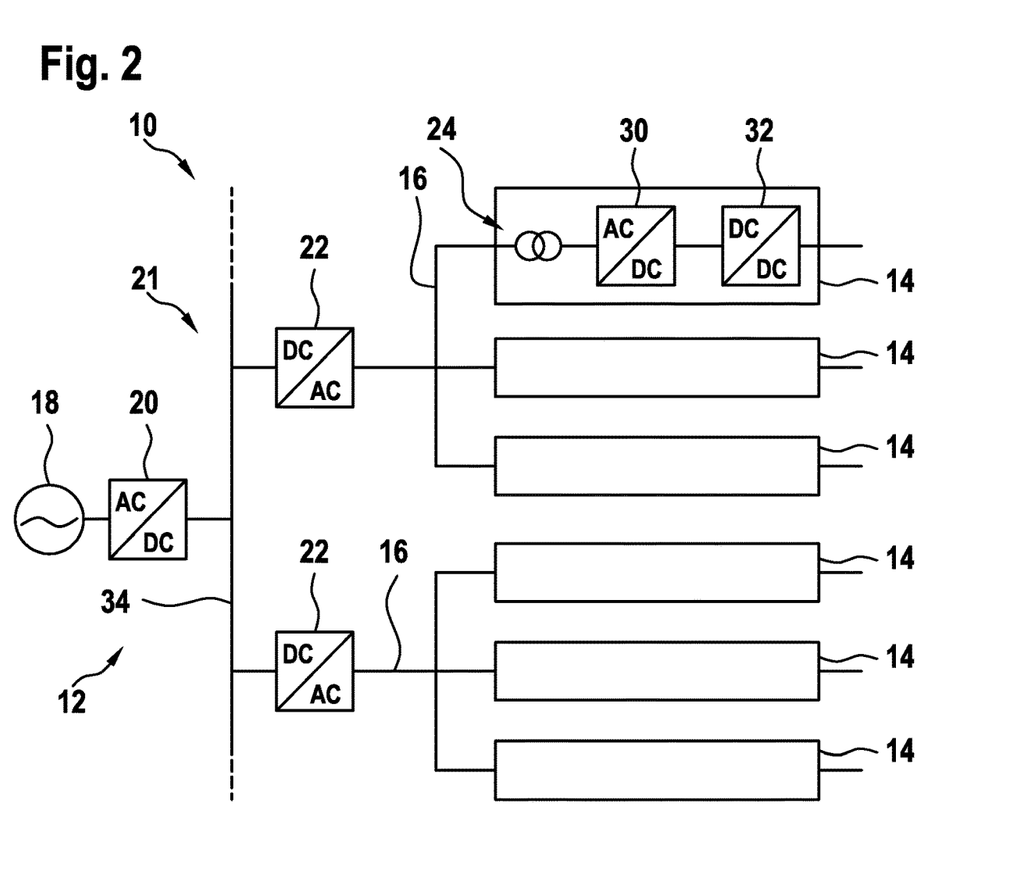
FIG. 2 schematically shows a charging station according to a further embodiment of the invention.

As shown in FIG. 2, the components 20, 22 of the central part 12 also may be distributed into several housings and/or buildings. It also may be possible that at least two DC-to-AC converters 22, such as the ones as described with respect to FIG. 1, are connected to the DC link provided by the AC-to-DC converter 20.

The AC-to-DC converter 20 and the at least two DC-to-AC converters 22 may be interconnected with a DC distribution network 34. The DC voltage in the DC distribution network 34 may be medium voltage, for example between 3.3 kV and 20 kV. For example, in a rather large charging station 10, a single low voltage high frequency AC distribution network 16 may lead to large conduction losses in the AC distribution network 16. In order to achieve highly efficient distribution, the intermediate DC distribution network 34 may be included. That is, a medium DC voltage, which is available by rectifying a medium voltage AC voltage with the AC-to-DC converter 20, may be used for distribution to reduce long distance conduction losses. The charging station 10 and its central part 12 may be divided into several sub-charging areas and each sub-charging area may be equipped with a DC-to-AC converter 22, which may convert the medium DC voltage into a low voltage high frequency AC voltage for local distribution.

Figure 3:
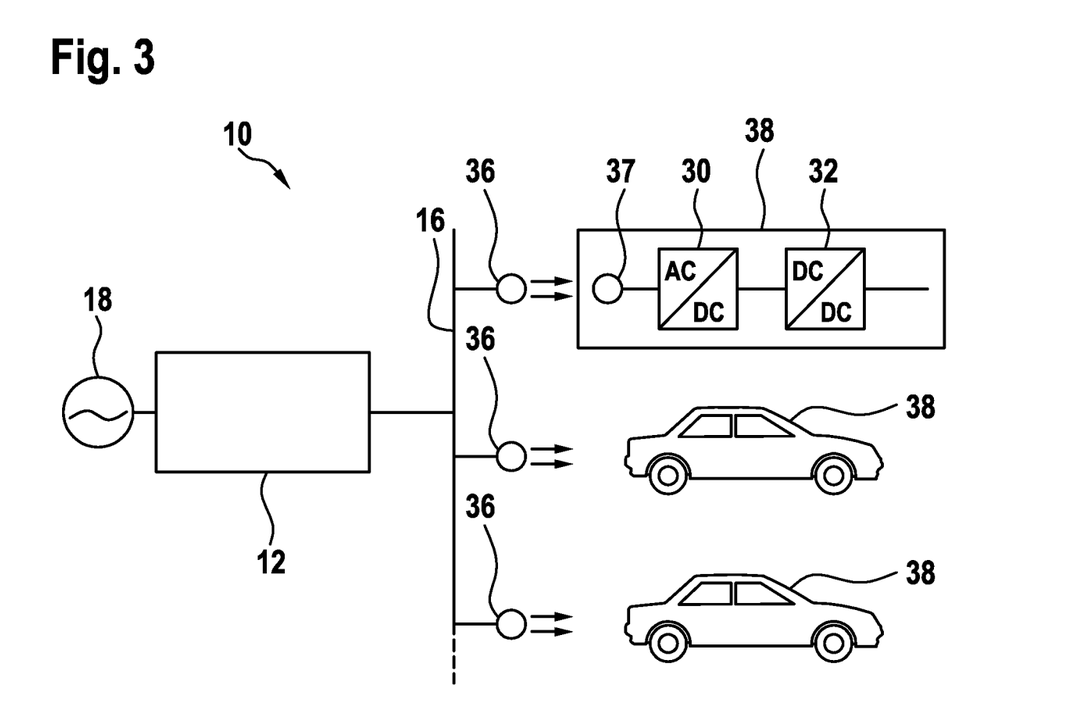
FIG. 3 schematically shows a charging station according to a further embodiment of the invention.

FIG. 3 shows a charging station 10, for example as in FIG. 1, where the charging poles 14 have been replaced with coils 36 for wireless power transfer. For example, such coils 36 may be provided in a ground below a parking place of an electric vehicle 38 or in a street.

Also, a high frequency AC distribution network 16 may be used as a primary side for a wireless power transfer to moving vehicles 38. In this case, by installing the high frequency AC distribution network 16 along a roadway, even moving electric vehicles 38 may be charged.

A secondary coil 37 of the electric vehicle 38 may couple via a magnetic field with the primary coil 36 (for example via an air gap). The electric vehicle 38 itself then may have an AC-to-DC converter 30 and optionally a DC-to-DC converter 32 as described with respect to FIG. 1 and/or as described below.

It has to be noted that wireless power transfer coils 36 as described with respect to FIG. 3 may be combined with the charging station 10 of FIG. 1, where, for example, some of the charging poles 14 may be replaced with such coils 36. It also may be possible that some or all of the charging poles 14 of FIG. 2 connected to one DC-to-AC converter 22 are replaced with coils 36 for wireless power transfer.

In any of the embodiments described herein, a renewable energy source, such as a photo voltaic power generation station, and/or a battery storage system may be directly connected to the high frequency AC distribution network 16 and/or the DC distribution network 34. The renewable energy source and/or the battery storage may be connected to the high frequency AC distribution network 16 via an AC-to-DC converter, analogous to the converter 22. The renewable energy source and/or the battery storage may be connected to the DC distribution network 34 via a DC-to-DC converter. This DC-to-DC converter also may be of a modular type.

In the embodiments shown in FIGS. 1 to 3 of the charging station 10, the power rating of the central part 12 may be smaller as the sum of the power ratings of the charging poles 14 and/or the coils 36, when it is assumed that only some of the charging poles 14 and/or coils 36 are used for charging.

For example, with respect to FIG. 1, the charging station 10 may have three charging poles 14 and the power rating of an individual charging pole may be 300 kW. Since it is very rare that all the charging poles 14 are in operation at the same time, the power rating of the central part 12 may be designed lower than the maximum required power. For example, even though the total power rating of all charging poles 14 is 900 kW, the central part 12 may be designed with a power rating of 600 kW or even of 300 kW. The total installed power rating of power electronics may be reduced with the high frequency AC distribution network supplying more than one charging pole 14 and/or coil 36.

Figure 4:
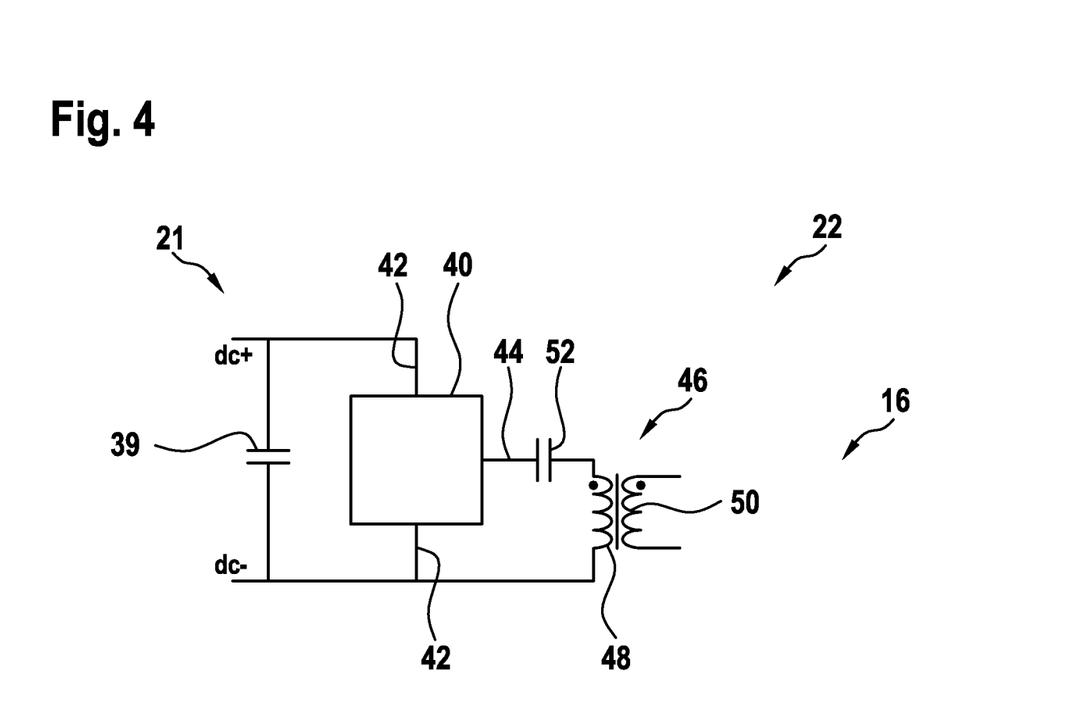
FIG. 4 schematically shows a DC-to-AC converter for a charging station according to an embodiment of the invention.

FIG. 4 shows a DC-to-AC converter 22 that may be used in the charging stations 10 as shown in FIGS. 1 to 3.

The DC-to-AC converter 22 comprises a DC link 21 with a capacitor 39, a converter unit 40 connected in parallel with its inputs 42 to the DC link 21 and a transformer 46, which is connected with its primary coil 48 to an output 44 of the converter unit 40. The secondary coil 50 of the transformer 46 is connected to the high frequency AC distribution network 16. A DC blocking capacitor 52 may be interconnected between the output 44 and the primary coil 48.

Figure 5:
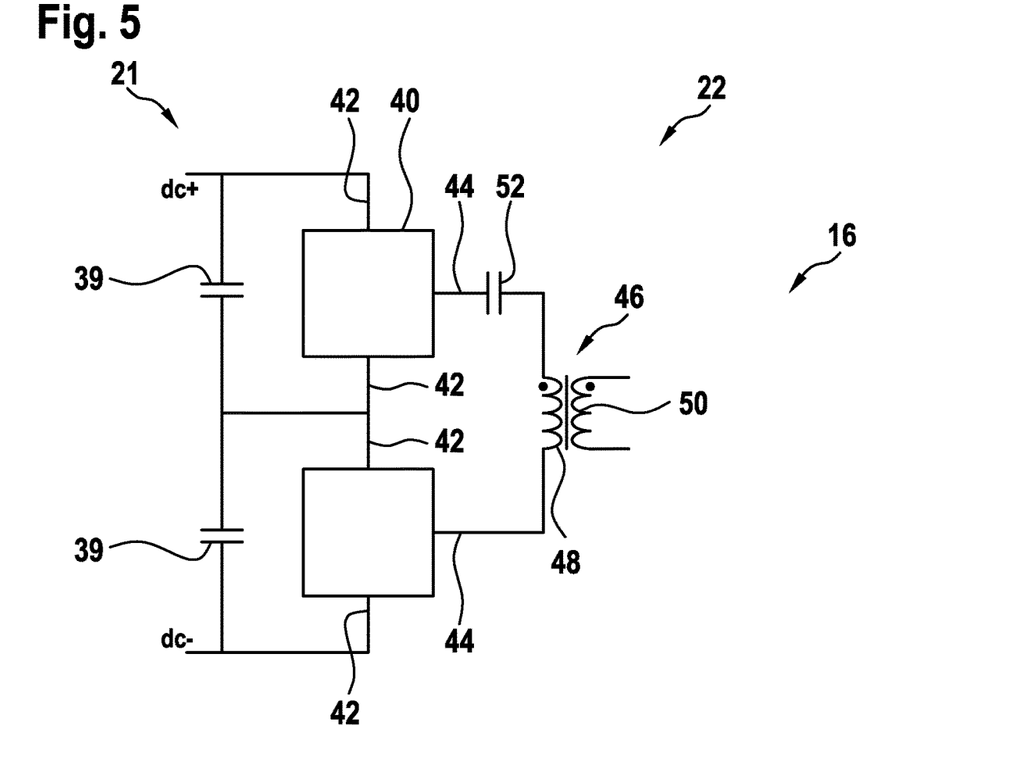
FIG. 5 schematically shows a further DC-to-AC converter for a charging station according to an embodiment of the invention.

As shown in FIG. 5, in the case of higher voltages, two or more converter units 40 may be connected in series with their input 42. Every one of these converter units 40 may be connected in parallel to a capacitor 39 of a split DC link 21, which is composed of series-connected capacitors 39. In the case of FIG. 5, the outputs 44 of two converter units 40 may be connected via the primary coil 48 of the transformer 46 with each other.

Figure 6:
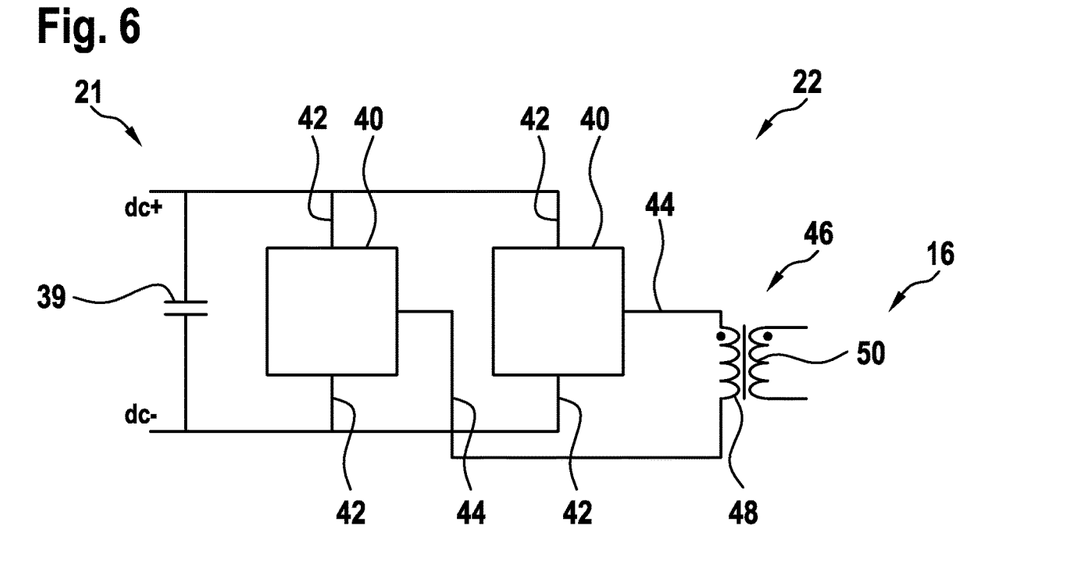
FIG. 6 schematically shows a further DC-to-AC converter for a charging station according to an embodiment of the invention.

As shown in FIG. 6, in the case of higher currents, two or more converter units 40 may be connected in parallel with their inputs 42 and in parallel to the DC link 21. As in FIG. 5, the outputs 44 of two converter units 40 may be connected via the primary coil 48 of the transformer 46 with each other.

Figure 7:
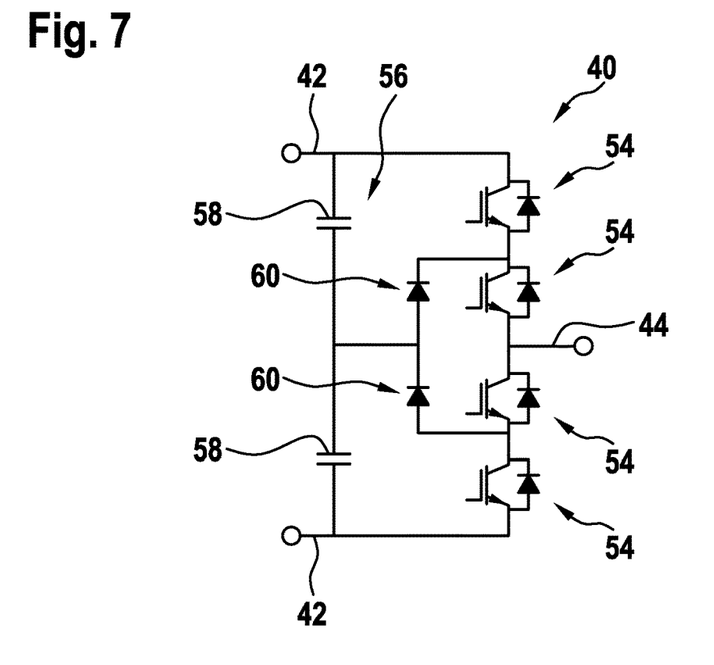
FIG. 7 schematically shows a converter unit for a charging station according to an embodiment of the invention.
Figure 8:
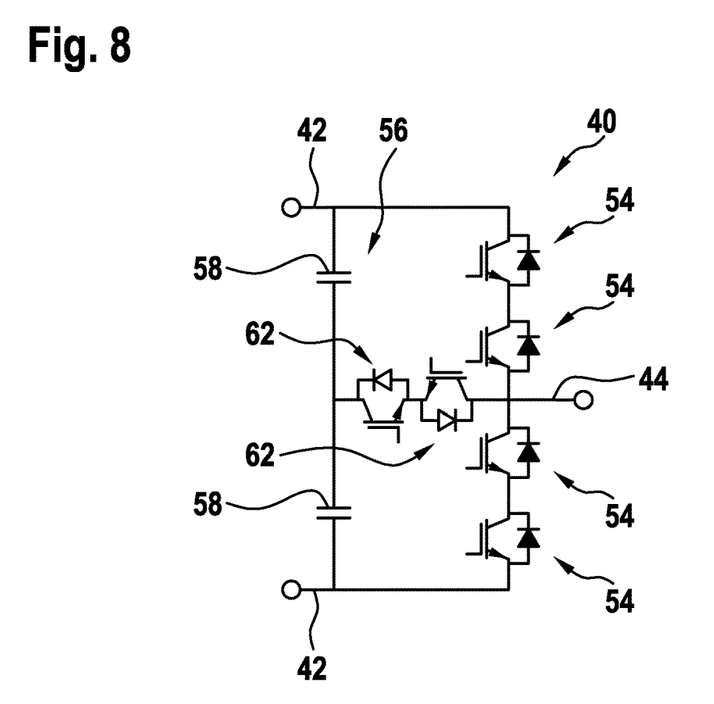
FIG. 8 schematically shows a further converter unit for a charging station according to an embodiment of the invention.

FIGS. 7 to 8 show possible topologies for the converter units 40 as shown in FIGS. 4 to 6 and below.

Figure 9:
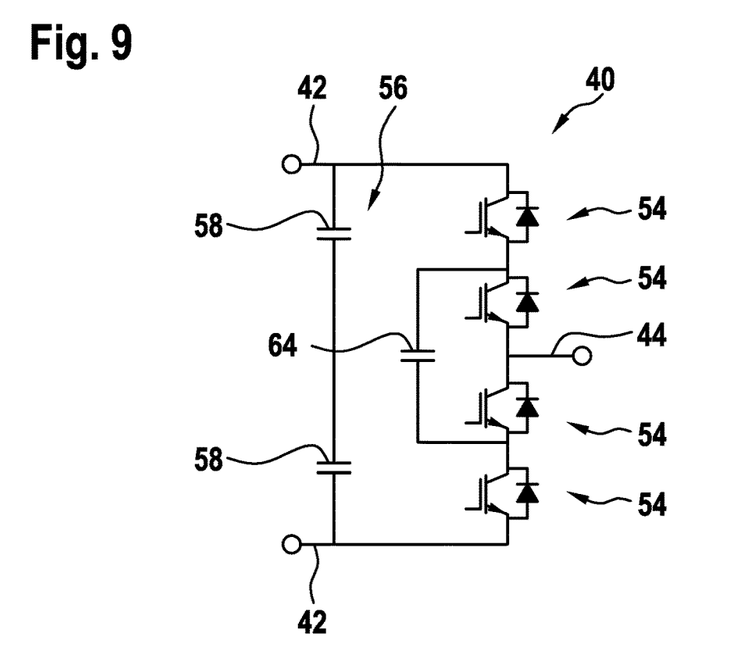
FIG. 9 schematically shows a further converter unit for a charging station according to an embodiment of the invention.

FIGS. 7 to 9 show converter units 40, which comprise 4 series-connected semiconductor switches 54, which are interconnected between the inputs 42. At the middle point, the switches 54 provide the output 44. Every converter unit 40 may comprise and/or may be interconnected with a DC link 56, which may comprise one or more series-connected capacitors 58.

FIG. 7 is a neutral point clamped converter unit 40, in which two intermediate middle points between two upper und two lower switches 54 are connected via diodes 60 with a middle point of a split DC link 56.

FIG. 8 is a T-type converter unit 40, where the middle point between the switches 54 providing the output 44 is interconnected via two anti-series-connected switches 62 with the middle point of the split DC link 56.

FIG. 9 is a flying capacitor type converter unit 40, where two intermediate middle points between two upper und two lower switches 54 are connected via a capacitor 64 with each other.

Figure 10:
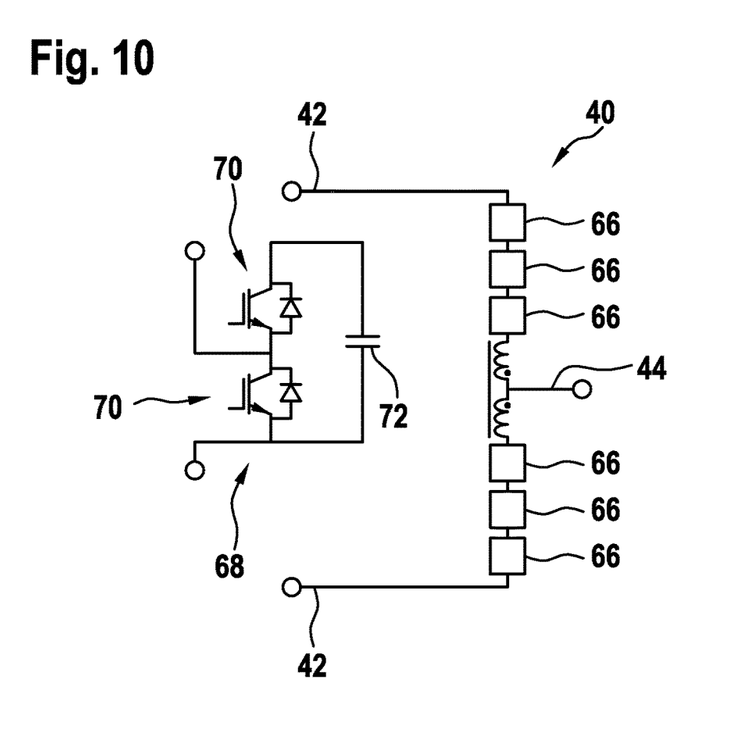
FIG. 10 schematically shows a further converter unit for a charging station according to an embodiment of the invention.

FIG. 10 shows a modular multi-level converter unit 40, which comprises a plurality of series-connected converter modules 66, which are interconnected between the inputs 42. The output 44 is provided at a middle point between the converter modules 66. Every converter module 66 may comprise a converter bridge 68 composed of two switches 70 and a capacitor 72 connected in parallel to the converter bridge 68.

Figure 11:
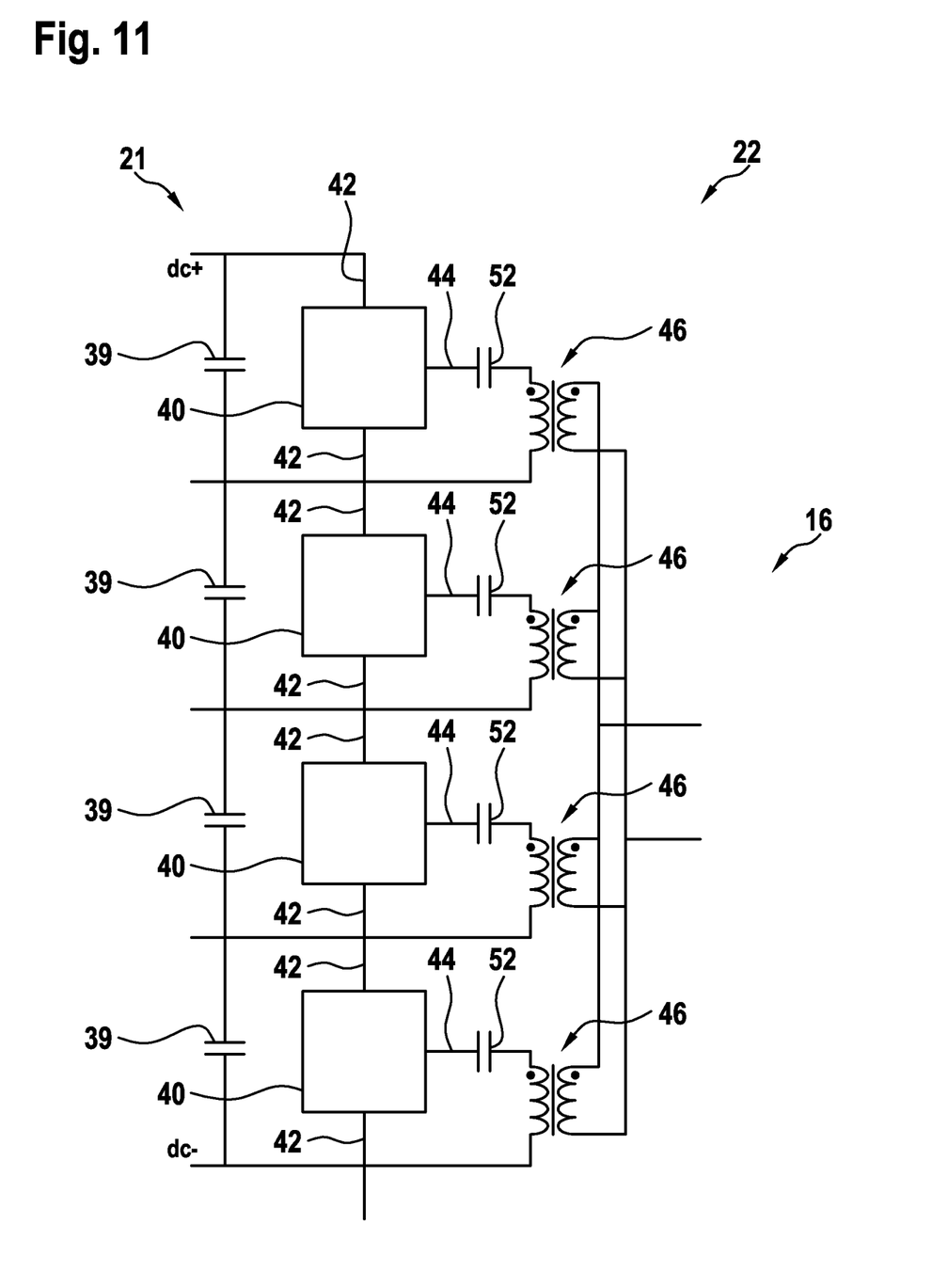
FIG. 11 schematically shows a further DC-to-AC converter for a charging station according to an embodiment of the invention.
Figure 12:
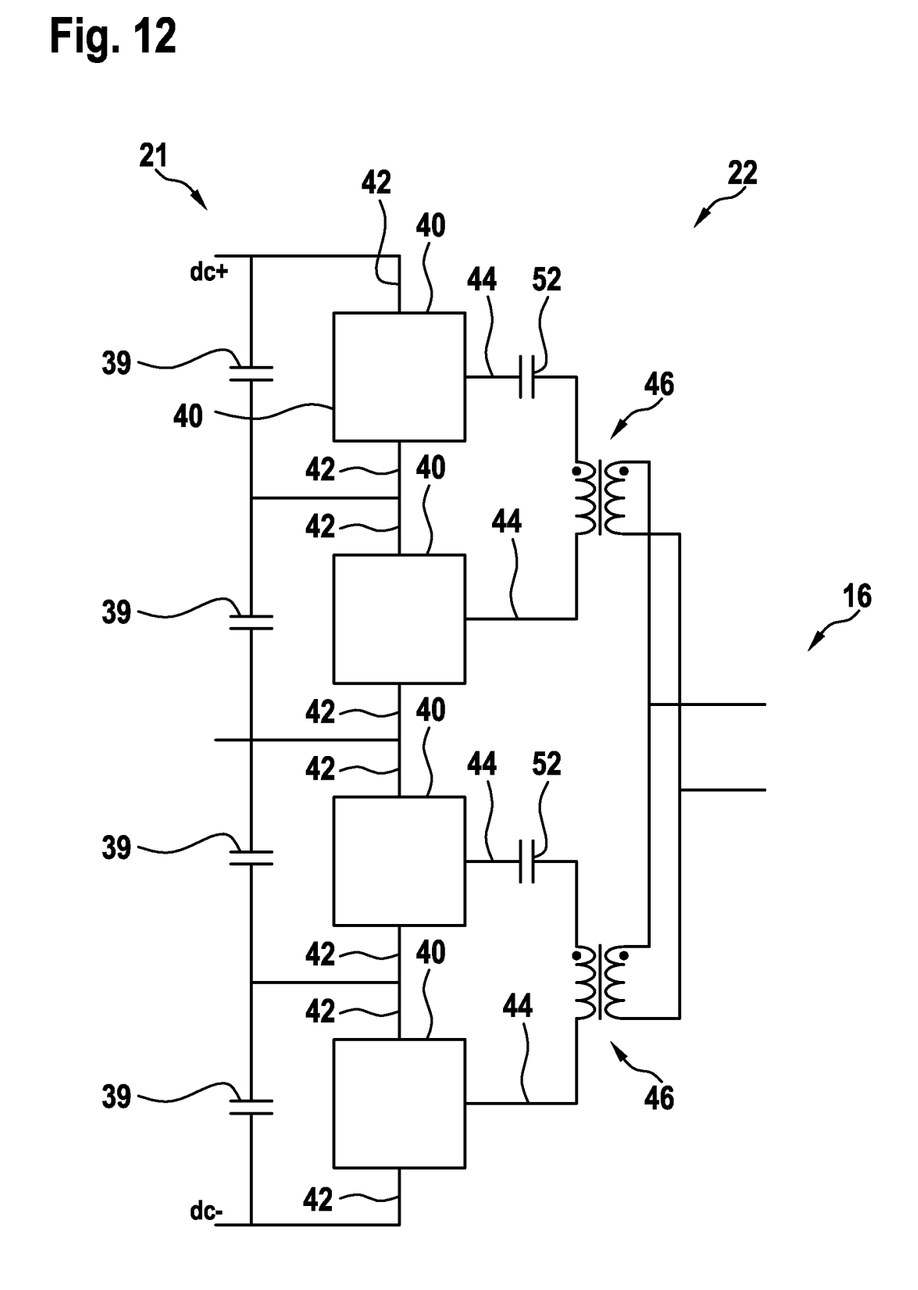
FIG. 12 schematically shows a further DC-to-AC converter for a charging station according to an embodiment of the invention.

FIG. 11 and FIG. 12 show two further examples of a DC-to-AC converter 22. A plurality of converter units 40 (here 4) are connected in series with their inputs 42. Every one of these converter units 40 is connected in parallel to a capacitor 39 of a split DC link 21, which is composed of series-connected capacitors 39.

In FIG. 11, every converter unit 22 is associated with one transformer 46. The output 44 of every converter unit 22 is connected via the primary coil of the transformer 46 with one of its inputs 42. All transformers 46 are connected in parallel with their secondary coils.

In FIG. 12, two converter units 22 are associated with one transformer 46. The output 44 of a first converter unit 22 is connected via the primary coil of the respective transformer 46 with the output 44 of a second converter unit 22. Again, the transformers 46 are connected in parallel with their secondary coils.

Figure 13:
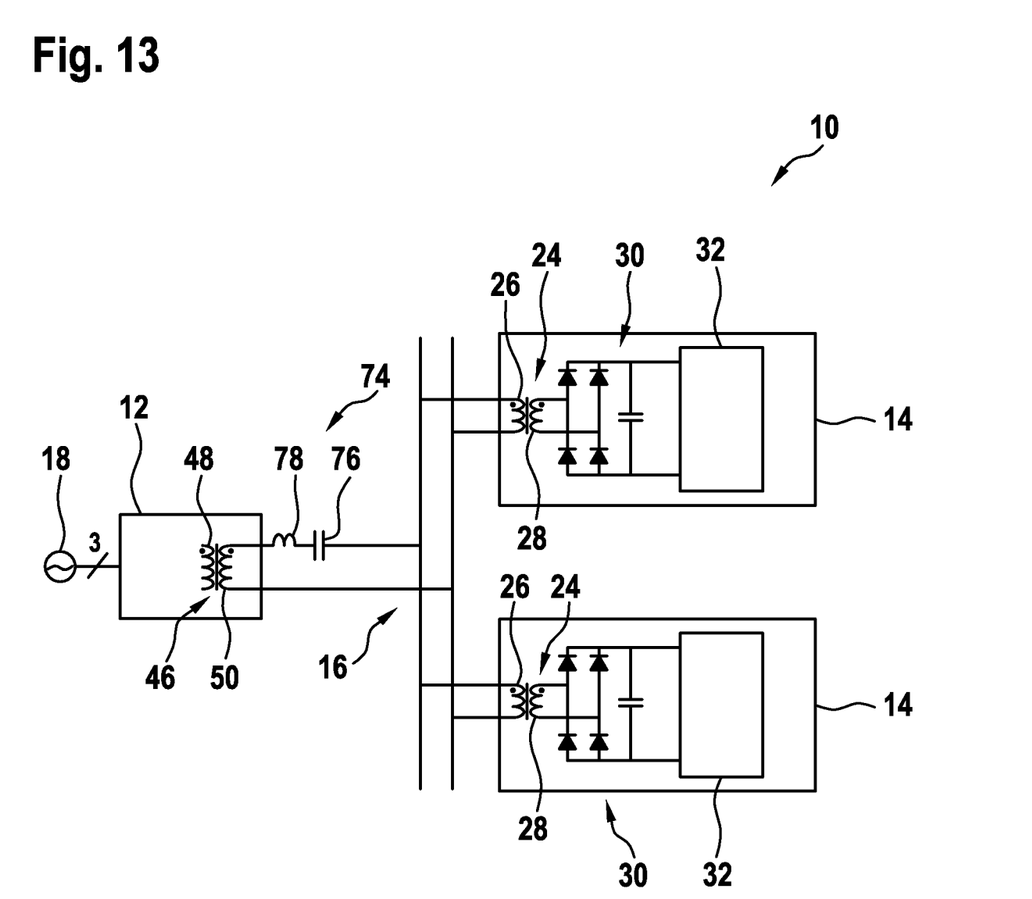
FIG. 13 schematically shows a charging station according to a further embodiment of the invention.
Figure 14:
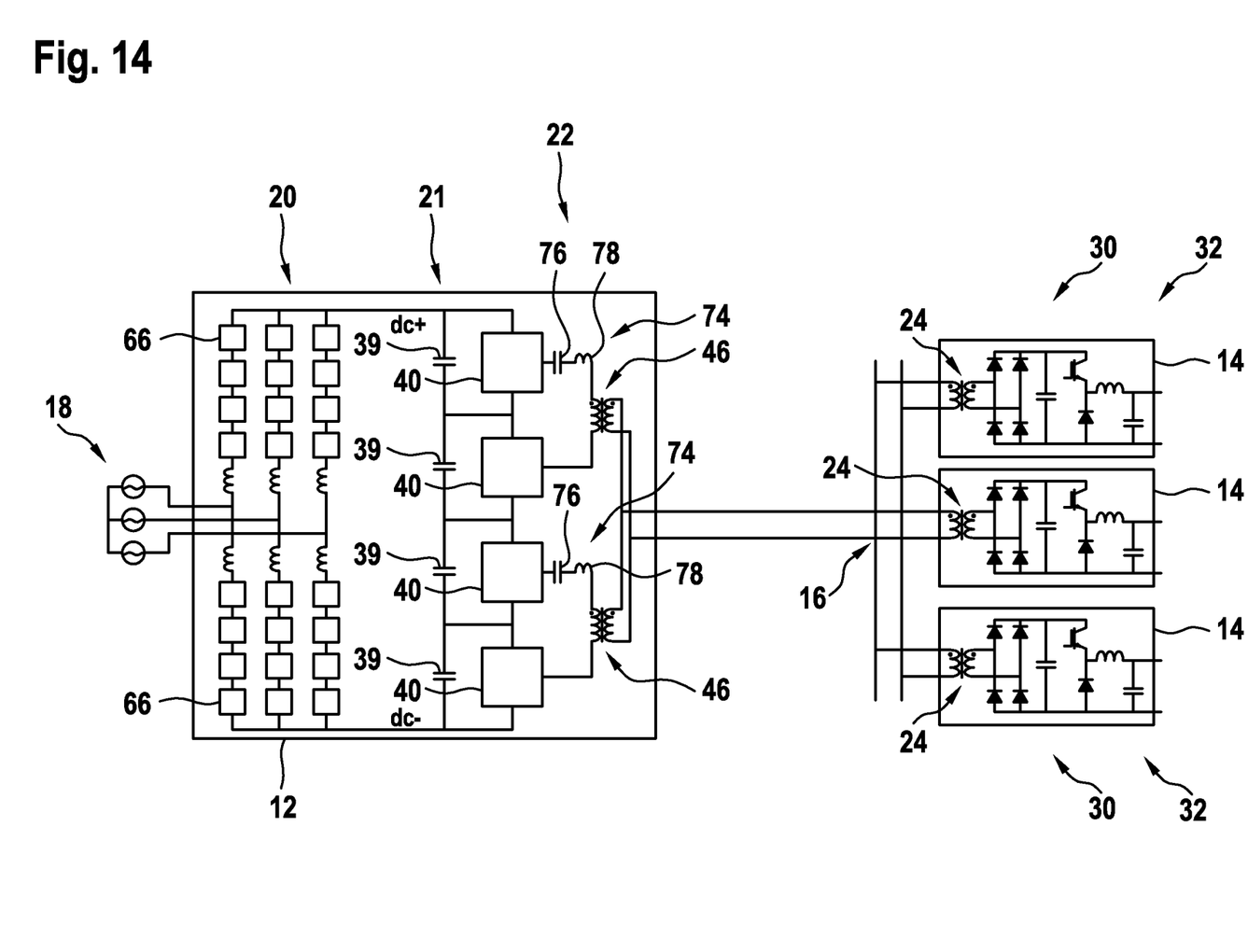
FIG. 14 schematically shows a charging station according to a further embodiment of the invention.

FIG. 13 and FIG. 14 show further examples of charging stations, where a resonant tank 74 is provided in the high frequency section. Resonant operation may be used for the high frequency AC distribution network 16.

The resonant tank 74 may comprise a resonant capacitor 76 and a resonant inductor 78 and/or may be used to make the current waveform in the distribution network 16 more of sinusoidal shape. With a resonant operation, a soft switching for the converter units 40 of the DC-to-AC converter 22 may be achieved.

As shown in FIG. 13, one way to implement the resonant operation is inserting the resonant tank 74 directly in the distribution network 16. The resonant tank 74 may be connected between the one or more transformers 46 of the central part 12 and the transformers 24 of the charging poles 14 (and/or the coils 36 for wireless power transfer).

As shown in FIG. 14, one or more resonant tanks 74 may be connected between the output 44 of a converter unit 40 and the transformer 46. In this case, a resonant tank 74 may be provided for every transformer 46. In general, the DC blocking capacitor 52 and a leakage inductance 78 of the transformer 46 may be used for the resonant tank 74.

FIG. 14 furthermore shows an exemplary overall circuit diagram of a charging station 10. For every phase of the medium voltage from the grid 18, the AC-to-DC converter 20 of the central part 12 comprises a modular multi-level converter as shown in FIG. 10, which is composed of converter modules 66 as shown in FIG. 10. These modular multi-level converters are connected in parallel to the DC link 21.

In general, the AC-to-DC converter 20 of the central part 12 may be of any type of rectifier stage. Like the DC-to-AC converter 22, a modular converter and/or the converter types as shown in FIGS. 7 to 10 may be used.

In summary, the high frequency AC distribution network 16 in particular in combination with a modular DC-to-AC converter 22 of the central part 12 of the charging station 10 may result in a small foot print and high power density for the high frequency transformers 46, 24. An easy scaling with respect to the medium voltage provided by the grid 18 is possible due to the modularity of the DC-to-AC converter 22. Furthermore, the power rating of the central part 12 may be reduced and the solution is compatible with the interconnection of renewable energy source and an energy storage for grid support and micro-grid functionalities.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10 charging station
12 central part
14 charging pole
16 high frequency AC distribution network
18 electrical grid
20 AC-to-DC converter
21 DC link
22 DC-to-AC converter
24 transformer
26 primary coil
28 secondary coil
30 AC-to-DC converter
32 DC-to-DC converter
34 DC distribution network
36 coil for wireless power transfer
37 secondary coil of electric vehicle
38 electric vehicle
39 DC link capacitor
40 converter unit
42 input
44 output
46 transformer
48 primary coil
50 secondary coil
52 DC blocking capacitor
54 semiconductor switch
56 DC link
58 capacitor
60 diode
62 semiconductor switch
64 capacitor
66 converter module
68 converter bridge
70 semiconductor switch
72 capacitor
74 resonant tank
76 capacitor
78 inductor

The invention claimed is:

1. A charging station for electric vehicles, the charging station comprising:
a central part configured to convert a grid AC voltage from an electrical grid into a high frequency AC voltage;
a distribution network configured to distribute the high frequency AC voltage; and
a plurality of coils directly connected to the distribution network, wherein each of the plurality of coils is configured to transfer energy to an electrical vehicle, wherein the central part comprises at least one transformer at an output side, which is connected to the distribution network, the central part comprises a grid side AC-to-DC converter for receiving the grid AC voltage and at least one network side DC-to-AC converter, which are interconnected via a DC link, and wherein each of the DC-to-AC converters comprises two converter units, each of the two converter units comprising an output, which are connected via the transformer of the central part.

2. The charging station of claim 1,
wherein the central part comprises at least two transformers having secondary coils connected in parallel and/or in series to the distribution network.

3. The charging station of claim 1,
wherein the central part comprises at least two DC-to-AC converters, which are connected to the DC link via a DC distribution network.

4. The charging station of claim 1,
wherein the DC-to-AC converter is composed of at least one converter unit, which is one of a neutral point clamped type, a T type, a flying cap type, or a modular multi-level converter type.

5. The charging station of claim 1,
wherein the DC-to-AC converter is composed of at least two converter units, each of the at least two converter units comprising an input, which are connected in series via the inputs; and/or
wherein the at least two converter units, are connected in parallel via the inputs.

6. The charging station of claim 1,
wherein a resonant tank comprising a capacitor and an inductor is connected in the distribution network.

7. The charging station of claim 6,
wherein the resonant tank is connected between the transformer of the central part and the plurality of coils.

8. The charging station of claim 1,
wherein a resonant tank comprising a capacitor and an inductor is connected between a converter unit of the central part and the transformer of the central part.

9. The charging station of claim 1,
wherein the grid AC voltage is a medium voltage of more than 3 kV; and/or
wherein the high frequency AC voltage is a low voltage of less than 3 kV.

10. The charging station of claim 1,
wherein a frequency of the grid AC voltage is less than 100 Hz; and/or
wherein the frequency of the high frequency AC voltage is more than 400 Hz.

11. The charging station of claim 1,
wherein at least some of the plurality of coils are part of a transformer integrated into a charging pole.

12. The charging station of claim 11,
wherein the charging pole comprises an AC-to-DC converter configured to receive a voltage from the transformer;
wherein the AC-to-DC converter of the charging pole supplies a DC-to-DC converter to generate a charging voltage.

13. The charging station of claim 1, wherein at least some of the plurality of coils are coils configured to wirelessly transfer energy via an air gap.

14. The charging station of claim 1, wherein the outputs of the two converter units are connected with each other via a primary coil of the transformer.

* * * * *